No. 812,818. PATENTED FEB. 20, 1906.
E. W. BULLARD.
DRIVING MECHANISM FOR PROFILING MACHINES.
APPLICATION FILED MAY 26, 1904.
2 SHEETS—SHEET 1.
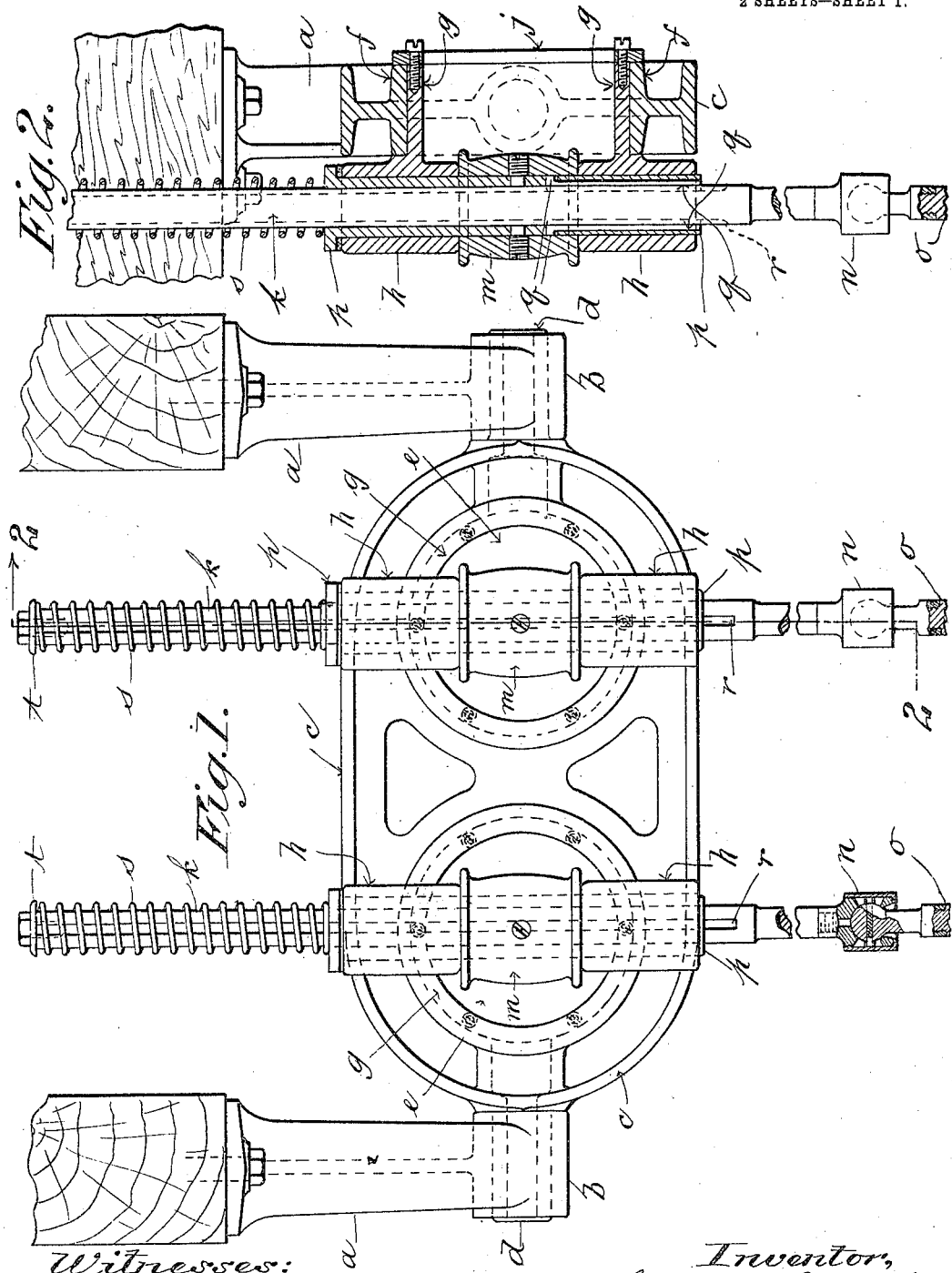
Witnesses:
K. I. Clemons
M. S. Crozier
Inventor,
Edwin W Bullard
by Chapin & Co
Attorneys.

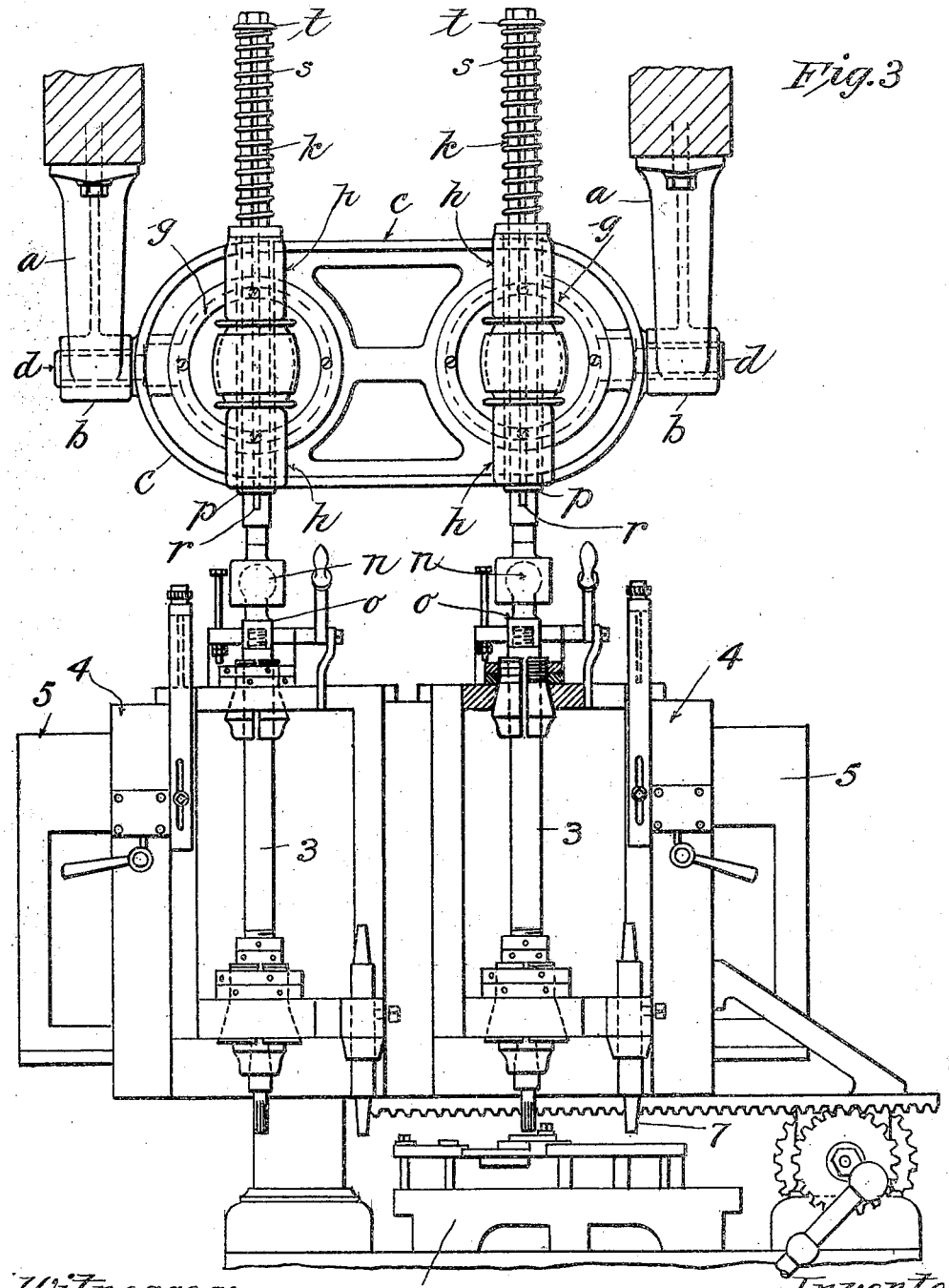

UNITED STATES PATENT OFFICE.

EDWIN W. BULLARD, OF SPRINGFIELD, MASSACHUSETTS.

DRIVING MECHANISM FOR PROFILING-MACHINES.

No. 812,818.  Specification of Letters Patent.  Patented Feb. 20, 1906.

Application filed May 26, 1904. Serial No. 209,924.

*To all whom it may concern:*

Be it known that I, EDWIN W. BULLARD, a citizen of the United States of America, residing at Springfield, in the county of Hampden and State of Massachusetts, have invented new and useful Improvements in Driving Mechanism for Profiling-Machines, of which the following is a specification.

This invention relates to the construction of power-transmission devices, the object thereof being to provide a support for one or more spindles—such as are used, for example, in profiling-machines—the object of the invention being especially to provide a spindle-support or counter-shaft which will permit the spindle to be swung in its support in two planes at right angles one to the other without interfering with the driving means for the spindle.

A further object of the invention is to provide a construction comprising a bearing of the character described in which a spindle is supported to move in its bearings endwise and has a universal joint interposed between the end thereof and the tool-holding chuck of a profiling-machine, thus permitting the use of a one-piece shaft above the universal joint, a counterbalancing-spring being applied to the spindle.

In the drawings forming part of this application, Figure 1 is a side elevation of a spindle-support, showing bearings made for two spindles, this being the preferred construction. Fig. 2 is a sectional view on line 2 2, Fig. 1. Fig. 3 is a front elevation of a part of a profiling-machine, showing the sliding carriage thereon carrying the cutter-spindles and showing the direct connection between the cutter-spindles and the driving-spindles of this invention.

Referring to the drawings, *a a* indicate two ordinary hanger-brackets, in the lower ends of which are the bearings *b*.

*c* indicates an oblong metal plate having trunnions *d* at the ends of the long axis thereof, which trunnions are located in the bearings *b* of the hangers. The plate *c* is of cast metal, preferably, there being cast therein two circular openings *e*, the border of which, as shown in Fig. 2, is an annular flange *f*, perpendicular to the sides of the plate *c*. The inner surface of this flange *f* is turned off and constitutes a bearing for a ring *g*, which carries the diametrically-disposed spindle-bearings *h* thereon. These bearings and the ring *g* are all made in one piece, and on that side of the ring on which the bearings are located the border of the ring is flanged, as shown in Fig. 1, the inner surface of the flange bearing against the edge of the flange *f*, and on the opposite side of the plate a loose ring *j* is screwed to the end of the ring *g* and overlaps the edge of the flange *f*, thus securing the ring *g* in proper rotative position in the plate *c*. In the bearings *h* the spindle *k* is carried, a pulley *m*, located between the bearings, being secured to the spindle to rotate the same in such manner as will permit the spindle to move endwise through the pulley and bearings. This spindle *k* is in one piece, and at the lower end thereof is secured a universal joint *n*, to the free end *o* of which a tool-spindle may be connected. The universal joint *n* forms, however, no part of this invention and is merely shown in a conventional way in the figures. A detailed description of this joint is fully set forth in my prior patent, dated October 4, 1904, numbered 771,457. There are a number of ways of supporting the spindle *k* whereby it may have endwise movement in its bearings and be rotated by a pulley or other driving means, though it also may move endwise. The construction, however, shown herein is the preferred construction, and it consists in locating a sleeve *p* in the bearings *h*, extending through both of them, and to this sleeve the pulley *m* is secured by screws or otherwise, the lower end of the sleeve being slotted to receive the keys *q*, which project into suitable spline-grooves *r*, milled longitudinally in the spindle. Thus the pulley *m* will rotate the sleeve and the sleeve the spindle. At the same time the sleeve provides a long one-piece bearing for the spindle.

Between the upper end of the spindle *k* and the uppermost bearing *h* a spiral spring *s* is located, the spindle being provided with a circular plate *t*, against which the spring may bear. The tension of this spring is so regulated that it will support the weight of the spindle, counterbalancing the latter, whereby its endwise movement may be effected with as much ease in one direction as the other. This is quite essential on profiling-machines where the cutters, driven by the spindles *k*, must be guided by a pilot-spindle running around or over a pattern-plate.

Referring to Fig. 3 of the drawings, the invention forming the subject of this application is shown as it would be connected with the cutter-spindles of a profiling-machine, and in said Fig. 3, 3 indicates said cutter-spindles, these being mounted in a sliding head 4, mounted on a frame 5 of the profiling-machine in such manner that the lower end of the cutter-spindles will overhang the work-holding bed 6, which is provided with a suitable feed movement (not shown) extending transversely of the line of movement of the cutter-head, these latter being moved on the frame 5 by means of a rack and pinion, such as is shown, or by any other suitable feed movement. When the cutter-spindles have been properly adjusted, the pilot-spindle 7 is adjusted to the pattern-plate, whereby the feed movement of the work-table will impart lateral movement to the head 4, as usual in machines of this type.

In all profiling work generally the spindles are mounted in pairs, as shown herein, one of the cutters being used to rough out the work and the other to finish it; but it is obvious that it would be entirely within the scope of the invention to make the plate $c$ with only one circular bearing therein for a spindle of the character described instead of constructing the plate to carry two spindles, as shown. The great advantage of the construction shown herein is that it permits the spindles to be swung sidewise independently, whereby work may be performed on an irregular piece without any disturbance of the driving-belt on the pulley $m$, for the reason that the swinging movements of the spindles independently in this plane operates only to make a turn in the driving-belt, and the swinging movement of the plate $c$ in the opposite plane will operate only to tighten the belt along one edge thereof; but the pulleys $m$ being located at the intersection of the axes of these planes the degree of movement in either case is very slight.

There are certain disadvantages inherent in the driving mechanism of the cutting-tools in profiling-machines which are obviated by reducing as far as possible the number of joints and connections therein, and the advantage of the construction shown herein must therefore be apparent, as there is but one jointed connection between the driving-spindle $k$ and the cutting-tool, which connection is represented by the universal joint $n$.

While the spring applied to the lever end of the spindle, as shown and described herein, to counterbalance the spindle is the construction which is preferred for this purpose, it is conceivable that the spindle might be counterbalanced by means of a flexible connection attached to the upper end thereof and carrying a weight; but any such change as that would fall within the scope of this invention.

Having thus described my invention, what I claim, and desire to secure by Letters Patent of the United States, is—

1. In a driving mechanism for cutters of profiling-machines or the like, the combination of a one-piece spindle and a universal joint secured to one end thereof; a bearing for said spindle rotatable in one vertical plane, a support for said bearing rotatable in another vertical plane at right angles to the first, a pulley on the spindle located at the intersection of said two planes, the spindle being endwise movable in its bearings.

2. In a driving mechanism for cutters of profiling-machines or the like, the combination of a one-piece spindle and a universal joint secured to one end thereof; a bearing for said spindle rotatable in one vertical plane, a support for said bearing rotatable in another vertical plane at right angles to the first, a pulley on the spindle located at the intersection of said two planes, the spindle being endwise movable in its bearings, together with a counterbalancing device for the spindle.

EDWIN W. BULLARD.

Witnesses:
WM. H. CHAPIN,
K. I. CLEMONS.